United States Patent
Sellers

(10) Patent No.: US 7,581,433 B2
(45) Date of Patent: Sep. 1, 2009

(54) CYLINDER LEAK DETECTOR

(76) Inventor: Gary Sellers, 226 Hay St., Rock Springs, WY (US) 82901

( * ) Notice: Subject to any disclaimer, the term of this patent is extended or adjusted under 35 U.S.C. 154(b) by 282 days.

(21) Appl. No.: 11/278,127

(22) Filed: Mar. 30, 2006

(65) Prior Publication Data

US 2006/0218993 A1   Oct. 5, 2006

Related U.S. Application Data

(60) Provisional application No. 60/666,761, filed on Mar. 30, 2005.

(51) Int. Cl.
*G01M 3/04* (2006.01)
(52) U.S. Cl. .................................................. 73/49.7
(58) Field of Classification Search .............. 73/49.7, 73/40, 116, 115, 47; 123/193.5; 116/266
See application file for complete search history.

(56) References Cited

U.S. PATENT DOCUMENTS

| | | | | |
|---|---|---|---|---|
| 1,477,796 A | | 12/1923 | Zimmerman | 73/47 |
| 1,493,633 A | | 5/1924 | Joyce | 116/266 |
| 1,525,404 A | | 2/1925 | McConkey | 73/47 |
| 1,570,520 A | | 1/1926 | Oehrli | 285/143.1 |
| 2,212,466 A | * | 8/1940 | Bradford | 73/47 |
| 2,328,289 A | * | 8/1943 | Morgan et al. | 73/47 |
| 2,679,753 A | | 6/1954 | Flamm | 73/115 |
| 2,811,852 A | | 11/1957 | Shuck et al. | 73/47 |
| 2,823,542 A | * | 2/1958 | Walraven et al. | 73/756 |
| 3,100,988 A | | 8/1963 | Mansfield | 73/116 |
| 3,115,033 A | | 12/1963 | Blowers | 73/756 |
| 3,224,260 A | | 12/1965 | Lankford | 73/756 |
| 3,260,119 A | | 7/1966 | Jones | 73/756 |
| 3,320,801 A | | 5/1967 | Rhindress, Jr. | 73/116 |
| 4,085,611 A | | 4/1978 | Schwartz | 73/115 |
| 4,574,620 A | * | 3/1986 | Cohl | 73/47 |
| 4,625,545 A | | 12/1986 | Holm et al. | 73/40 |
| 4,686,851 A | | 8/1987 | Holm et al. | 73/49.2 |
| RE33,075 E | | 10/1989 | Holm et al. | 73/40 |
| 5,624,239 A | * | 4/1997 | Osika | 417/187 |
| 5,795,995 A | | 8/1998 | Shimaoka et al. | 73/40 |
| 6,668,784 B1 | | 12/2003 | Sellers et al. | 123/193.5 |
| 6,813,934 B2 | | 11/2004 | Kang | 73/49.7 |

* cited by examiner

*Primary Examiner*—Hezron Williams
*Assistant Examiner*—Tamiko D Bellamy
(74) *Attorney, Agent, or Firm*—Thorpe North & Western LLP

(57) ABSTRACT

An apparatus and method for detecting cylinder leaks in an internal combustion engine includes a hose having an end configured for communication with a spark plug hole connecting to a cylinder to be tested and an end for attachment to a source of pressurized gas. Flow of pressurized gas into the cylinder is limited to the maximum amount of allowable gas leakage from the cylinder. The hose end configured for communication with the spark plug hole includes a resilient stopper sized to seal the end of the hose with respect to the spark plug hole when manually pressed into and held in the spark plug hole. If gas pressure builds up in the cylinder against the stopper during limited gas flow into the cylinder, leakage from the cylinder is below the allowed maximum leakage. Lack of gas pressure build-up indicates excessive cylinder leakage.

15 Claims, 2 Drawing Sheets

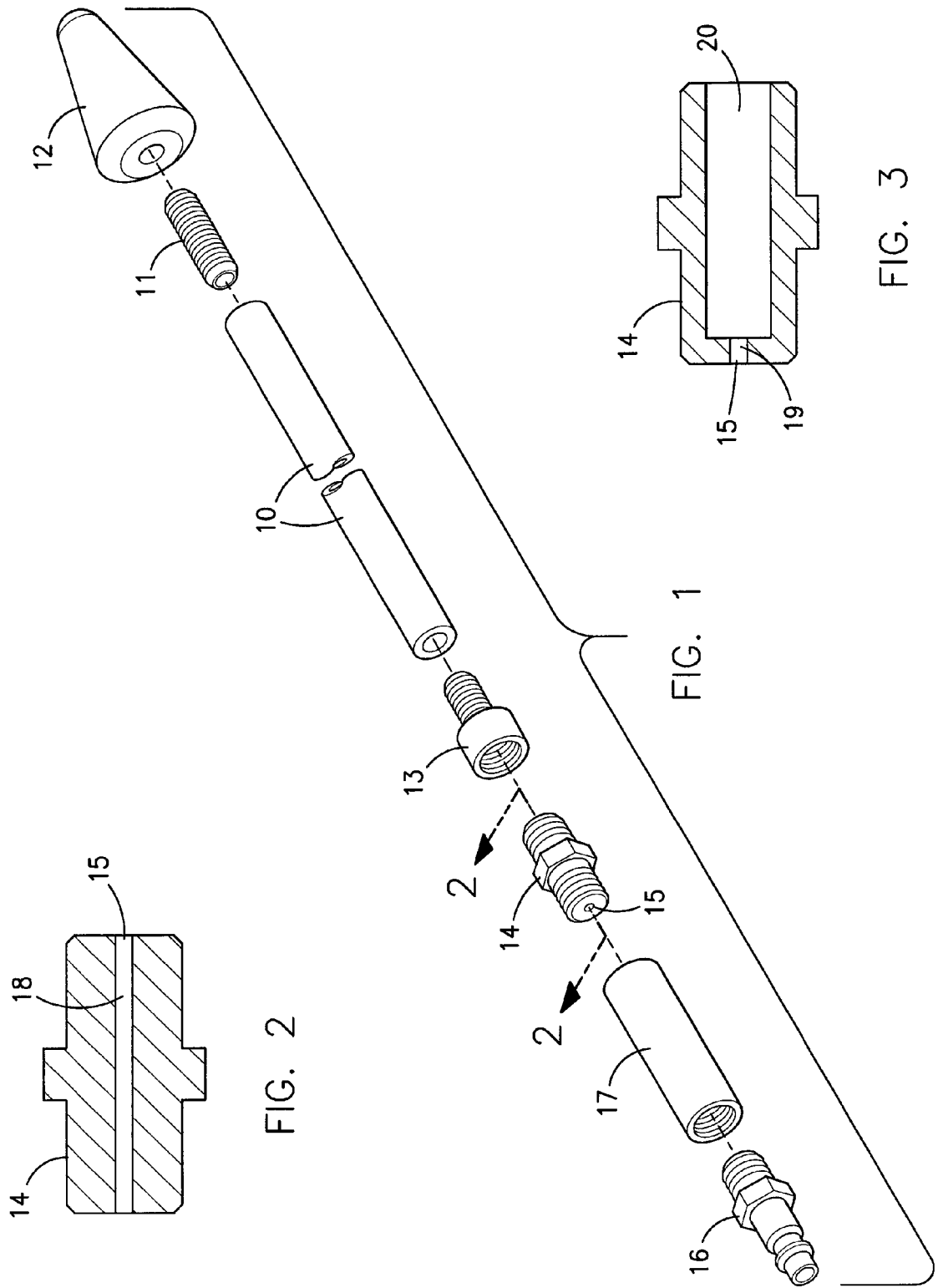

CYLINDER LEAK DETECTOR

RELATED APPLICATION

Figure 4:
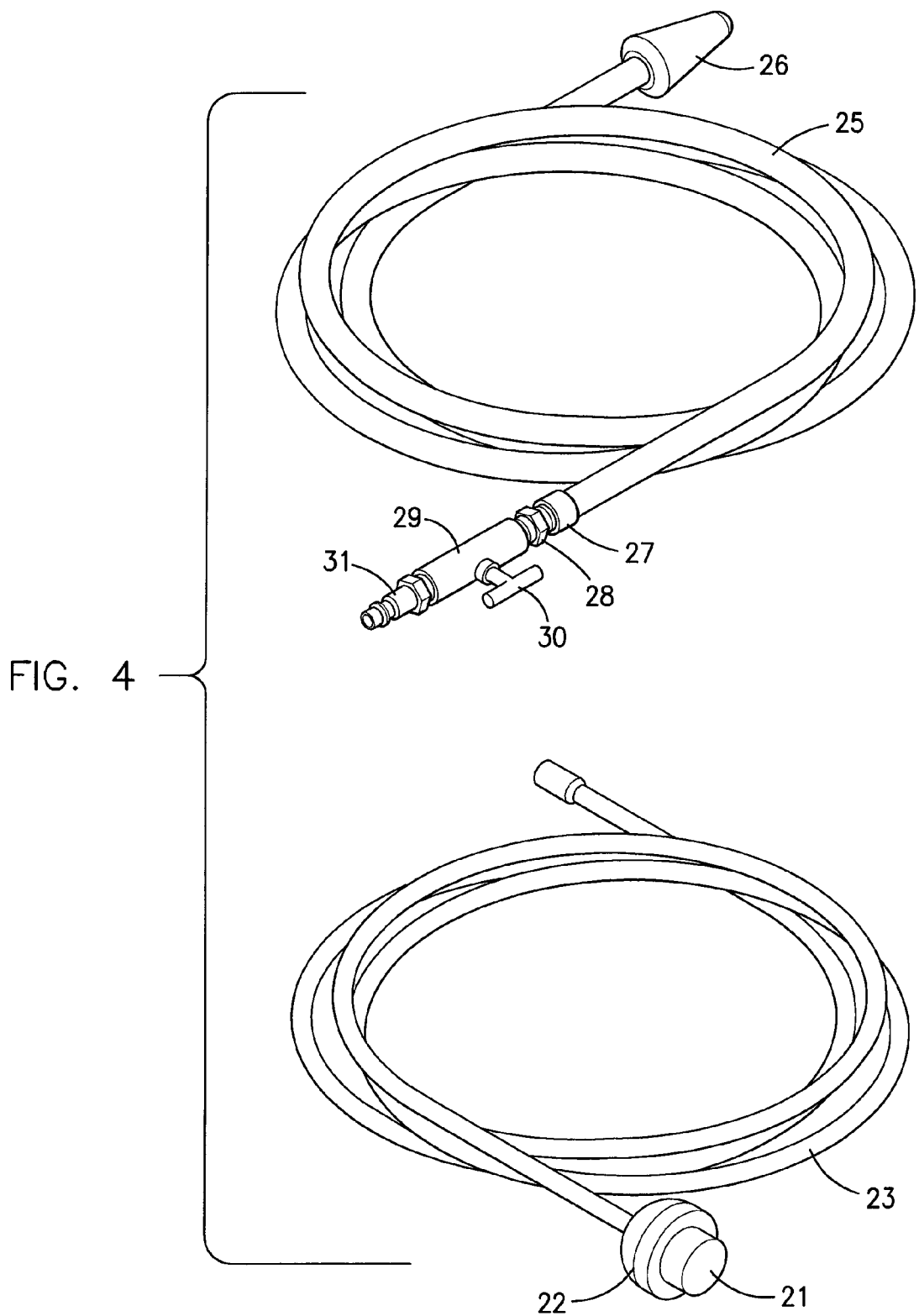

This application claims the benefit of provisional Application Ser. No. 60/666,761, filed Mar. 30, 2005, and entitled "Internal Combustion Engine Cylinder Leak Detector".

BACKGROUND OF THE INVENTION

1. Field

This invention is in the field of apparatus and methods for testing cylinders in internal combustion engines for compression leaks and for positioning pistons in cylinders in such engines.

2. State of the Art

Most compression leak detectors currently in use include a pressure gauge or other pressure measuring device for quantitatively measuring the pressure built up in an engine cylinder during the compression stroke of the piston in the cylinder as the engine is turned over several times, a device for pressurizing a cylinder and then reading a pressure measuring device to determine how fast pressure is lost, or a device for pressurizing both a chamber to be tested and a similar standard chamber and comparing the change in pressure in the test chamber to the change of pressure in the standard chamber so that temperature changes that can affect pressure measurements are compensated for.

U.S. Pat. No. 4,085,611 shows a hand held gun shaped device connected with a tube having a flexible end plug that is inserted into and held in a spark plug hole in an engine cylinder when the spark plug is removed. The device has a switch which can be operated by the user holding the device to operate the engine starter to turn over the engine. As the engine turns over, the pressure generated in the engine cylinder during the compression stroke of the piston in the engine cylinder is transmitted through the spark plug hole and the tube to a device cylinder in the device. The pressure transmitted through the tube builds up in the device cylinder in the device and acts against a spring loaded piston in the device cylinder to measure the pressure built up in the device cylinder. The pressure built up in the device cylinder is a measure of the compression built up in the engine cylinder and is recorded on a paper chart in the device. The engine is turned over three time for a pressure reading on the third turn over. A valve is provided in the tube from the engine cylinder so that pressure from the engine cylinder can enter the device cylinder but is blocked from escaping. Thus, the pressure is held in the device cylinder until manually released when another engine cylinder is to be tested.

U.S. Pat. No. 3,100,988 is similar in that a pressure gauge has a tube with a rubber stopper at its end that is inserted into and manually held in a spark plug hole in an engine cylinder when the spark plug is removed. The rubber stopper seals the hole. The device has a switch which can be operated by the user holding the device to operate the engine starter to turn over the engine. As the engine turns over, the pressure generated in the engine cylinder is transmitted to the gauge through the tube. The gauge measures the pressure built up in the engine cylinder during the compression stroke of the piston. The engine is turned over several times to get a maximum pressure reading. A valve is provided in the tube from the engine cylinder so that pressure can enter the tube but is blocked from escaping. Thus, the pressure is held in the tube until manually released when another engine cylinder is to be tested. The patent indicates that the pressure in the engine cylinder may be in the order of 125 pounds per square inch (PSI) and that the downward pressure necessary to hold down the rubber stopper in the spark plug hole to maintain a tight seal can be on the order of 100 pounds. With this device and with the device of U.S. Pat. No. 4,085,611, it is difficult for a user to hold the stopper in the spark plug hole to maintain a tight seal against the pressure build up in the engine cylinder to obtain an accurate measurement of the maximum engine cylinder pressure.

U.S. Pat. No. 4,686,851 teaches detecting leakage of a pressure vessel by pressurizing both a test chamber to be tested and a similar reference chamber known not to leak, and then determining if the pressure of the gas in the test chamber changes more over time than the pressure of the gas in the reference chamber. If the pressure of the gas in the test chamber changes more than in the reference chamber (the pressure of the gas in both chambers will generally change due to temperature changes which should be the same for both chambers), the additional change in the test chamber indicates a leak.

U.S. Pat. No. 4,625,545, which was reissued as U.S. Pat. No. RE 33,075, shows a pressure leak detector that pressurizes a test chamber to be tested and then compares the change of gas pressure in the chamber with the rate of change in temperature of the chamber (measured by an infrared detector), the difference in the rates of change being an indication of the test chamber leakage.

With most engines and for most engine repair purposes, it is not important to measure the amount of leakage from a cylinder, i.e., how fast the cylinder leaks, but merely to measure whether the cylinder leaks more than a certain acceptable amount. If leakage is over the acceptable amount, repair is necessary. If under the acceptable amount, no repair is indicated.

SUMMARY OF THE INVENTION

According to the invention, a cylinder leak detector provides a test of whether a cylinder leaks over an acceptable amount, but does not quantitatively measure the amount of leakage. Further, the cylinder leak detector of the invention may be used to indicate when a piston in an engine cylinder begins or is in its compression stroke to allow positioning of the piston at or near the bottom of the cylinder or to determine when the engine cylinder valves are closed. This positioning is necessary for conducting the leakage test of the invention and is also important to some types of engine repairs.

The present invention includes a hose that is connected at one end to a source of pressurized air, such as the normal shop compressed air supply in a vehicle service garage, and has a rubber stopper at the other end which is pressed by a user into an engine spark plug hole when the spark plug is removed and the test is to be conducted. The device includes an orifice therein which limits the flow of air through the hose and spark plug hole into the engine cylinder. The orifice restricts the flow of compressed air from the source of compressed air through the device into the engine cylinder. This restriction is important because it sets the acceptable amount of engine cylinder leakage measured by the device. If the engine cylinder leaks more air than the volume of air passing through the orifice into the engine cylinder, no pressure will build up in the engine cylinder. The user will be able to easily hold the stopper in the spark plug hole and will feel no pressure. If there is less leakage from the engine cylinder than the volume of air passing through the orifice into the engine cylinder, air pressure will build up in the engine cylinder to the pressure of the compressed air source, usually in the range of between about one hundred to about one hundred and twenty five pounds per square inch (PSI). A user holding the stopper in the spark plug hole can tell when pressure builds up in the engine cylinder. It is very difficult for a user to hold the stopper in the hole with one hundred pounds of pressure in the engine cylinder. The user will be able to tell that pressure is building up in the engine cylinder well before the pressure reaches one hundred PSI in the cylinder. Thus, the size of the orifice is chosen to allow flow of air through the orifice about equal to the maximum amount of air that is allowed to leak from the engine cylinder. In this way, if leakage from the engine cylinder is less than the maximum allowed amount, air flow into the engine cylinder is sufficient so that pressure will build up in the cylinder. However, if leakage is more than the maximum allowed, the air will leak from the engine cylinder at a faster rate than air flows into the cylinder and no pressure will build up in the engine cylinder. In such case, a user will be able to easily hold the stopper in the spark plug hole. It has been found that for use with most automotive internal combustion engines (which include most truck engines), leakage up to the amount of air that passes through an orifice of about one ten thousandth of an inch at about one hundred and twenty five PSI is acceptable. However, the size of the orifice can be selected for the particular anticipated use of the device and can vary from engine to engine. The device of the invention can be supplied with several collars each with a different size orifice, and the collar with the desired size orifice for a particular engine to be tested can easily be assembled into the device.

THE DRAWINGS

In the accompanying drawings, which show the best mode currently contemplated for carrying out the invention:

FIG. 1 is a pictorial assembly of a cylinder leak tester of the invention;

FIG. 2, a vertical section through the orifice of the device of the invention taken on the line 2-2 of FIG. 1;

FIG. 3, a vertical section similar to that of FIG. 2, but showing a different embodiment of orifice; and FIG. 4, a pictorial view of components used to test the leakage of a cylinder or the position of a piston in a cylinder according to the invention.

DETAILED DESCRIPTION OF THE ILLUSTRATED EMBODIMENTS

The present invention includes a hose that is connected at one end to a source of pressurized air, such as the normal shop compressed air supply in a vehicle service garage, and has a rubber stopper at the other end which is pressed by a user into an engine spark plug hole when the spark plug is removed and the test is to be conducted. The device includes an orifice therein which limits the flow of air into the engine cylinder. Referring to FIG. 1, a flexible hose 10 has a connector 11 at one end that connects the hose to a stopper or plug 12. A connector and adapter 13 at the other end of the hose allows the flexible hose 10 to be connected to a pipe fitting, here a collar or nipple 14, providing an orifice 15. The collar 14 is connected to a source of pressurized air, such as the normal shop compressed air supply in a vehicle service garage. This connection can be easily achieved when desired to use the device through a common quick connect coupling 16 secured to the collar 14 by a threaded sleeve or coupling 17. With the quick connect coupling 16, the coupling 16 is easily connected to a mating coupling, not shown, normally on the end of a hose connected to the normal shop compressed air supply.

As shown by FIG. 2, the orifice 15 can be a passage 18 of desired diameter extending through the collar 14, or, as shown by FIG. 3, the orifice can be a shorter passage 19 of the desired diameter extending through an end wall of the collar into a larger passage 20 through the collar 14. Any other arrangement and placement of an orifice can be used. If desired, a valve can be positioned in the device or can be part of the sleeve. The orifice restricts the flow of compressed air from the source of compressed air through the device into the engine cylinder. This restriction is important because it sets the acceptable amount of engine cylinder leakage measured by the device. If the engine cylinder leaks more air than the volume of air passing through the orifice into the engine cylinder, no pressure will build up in the engine cylinder. If there is less leakage from the engine cylinder than the volume of air passing through the orifice into the engine cylinder, air pressure will build up in the engine cylinder to the pressure of the compressed air source, usually in the range of between about one hundred to about one hundred and twenty five pounds per square inch (PSI). A user holding the stopper in the spark plug hole can tell when pressure builds up in the engine cylinder. It is very difficult for a user to hold the stopper in the hole with one hundred pounds of pressure in the engine cylinder. The user will be able to tell that pressure is building up in the engine cylinder well before the pressure reaches one hundred PSI in the cylinder. Thus, the size of the orifice is chosen to allow flow of air through the orifice substantially equal to the maximum amount of air that is allowed to leak from the engine cylinder. In this way, if leakage from the engine cylinder is less than the maximum allowed amount, air flow into the engine cylinder is sufficient so that pressure will build up in the cylinder. However, if leakage is more than the maximum allowed, the air will leak from the engine cylinder at a faster or equal rate than air flows into the cylinder and no pressure will build up in the engine cylinder. In such case, a user will be able to easily hold the stopper in the spark plug hole. It has been found that for use with most automotive internal combustion engines (which include most truck engines), leakage up to the amount of air that passes through an orifice of about one ten thousandth of an inch at about one hundred and twenty five PSI is acceptable. However, the size of the orifice can be selected for the particular anticipated use of the device and can vary from engine to engine. The device of the invention can be supplied with several collars 14, each with a different size orifice, and the collar with the desired size orifice for a particular engine to be tested can easily be assembled into the device. The indicated orifice size of one ten thousandth of an inch is a good all around choice for most engines.

FIG. 4 shows a device of the invention, along with a normal, commercially available starter button assembly having a starter button 21 in housing 22 and connecting wire 23. The starter button wire 23 is connected to the starter in the engine to be tested in normal manner and allows a mechanic while working on an engine to push the starter button 21 to operate the engine starter to turn over the engine. This is used to position the piston in the cylinder. In this embodiment, shown in FIG. 4, the hose is an eighteen inch long, quarter inch flexible hose which can withstand up to at least one hundred and twenty five pounds pressure with a rubber stopper and an orificed quarter inch hose to quarter inch pipe collar fitting or connector. The sleeve connecting the collar fitting to the quick connect fitting has a valve therein, but such a valve generally will not be provided as it is generally unneeded.

The device of the invention as shown in FIG. 4 includes a flexible hose 25, a stopper 26, a connector and adapter 27, a collar 28 which includes the desired size orifice, and a connecting sleeve 29 which includes a valve 30 and connects to a quick connect coupling 31.

In use, the user of the device will remove the spark plug from the engine cylinder to be tested. A means for operating the starter, such as the starter button assembly shown in FIG. 4, is connected to selectively operate the starter when desired. Such means could take the form of a person in the vehicle to operate the starter switch when desired. The device of the invention is connected to a source of compressed air and the stopper is pushed into and held in the spark plug hole. The stopper is sized to seal in the spark plug hole when pushed into and held in the hole by the user. If pressure builds up to force the stopper out of the hole enough to let air escape from the cylinder, or to require the user to exert force to hold the stopper in the spark plug hole, the cylinder valves are closed and leakage from the engine cylinder is less than the acceptable amount of leakage. In such case, the test of that cylinder for leakage is completed. If either the intake valve or the exhaust valve to the cylinder being tested is open, air is free to escape from the cylinder through the open valve and leakage from the cylinder cannot be tested. Thus, if pressure does not build up in the engine cylinder under test, either a valve is open or the cylinder leaks more than allowed. The first step then is to determine if a cylinder valve is open and to position the piston in the cylinder to close the valves. The device of the invention can be used to determine when the valves are closed. For this, the starter is operated, such as by depressing switch button 21, to turn over the engine as the stopper is held in the spark plug hole. As the engine is turned over, the piston moves up and down in the cylinder. When the valves close and the piston moves upwardly in the compression stroke of the engine, the movement of the piston creates pressure in the cylinder. This is the pressure that is measured by prior art gauges. With the stopper of the device of the invention in the spark plug hole, the user can tell as the pressure builds up in the cylinder. Where the cylinder does not leak excessively, a user can generally feel the pressure start to build just as the piston begins to move upwardly on it compression stroke. This is when the piston is substantially at the bottom of the cylinder and the valves are closed. Even where the cylinder leaks excessively, as the piston moves upwardly on its compression stroke, the compression is usually enough for a user to feel somewhere during the compression stroke to know when the valves are closed. If a valve is broken or damaged to the extent that no pressure builds up, this lack of pressure build up is an indication to the user of that problem.

In closing the valves or positioning the piston in the cylinder, the procedure is to quickly depress and release the starter button 21 (sometimes referred to as bumping the starter button by mechanics) to operate the starter for only a very short time. The short operation time of the starter moves the piston only a short distance in the cylinder so it is possible to stop the piston during the compression stroke or at or near the bottom of the cylinder at the start of the compression stroke.

With the valves in the cylinder closed, for leak detecting, the pressure in the cylinder is released by releasing the seal of the stopper in the spark plug hole and then again pressing the stopper into the spark plug hole to establish a seal. The user then determines whether pressure builds up in the cylinder from the pressurized air flowing through the device orifice into the cylinder as described above. If pressure builds up, any leakage of the cylinder is below the allowed amount. If pressure does not build up, the cylinder leaks more than the allowed amount. There may be several causes for such leakage which then have to be investigated and determined in normal diagnostic manner by the user. Such causes can be bad piston rings, bad valves, a bad cam shaft that operates the valves, etc., as known by mechanics.

As indicated, the invention is useful for positioning a piston in a cylinder. For example, in the method of replacing damaged threads in the spark plug hole or bore of an engine as described in U.S. Pat. No. 6,668,784, such patent being incorporated herein by reference, it has been found that rather than vacuuming the metal shavings from the cylinder which are formed while drilling and tapping the spark plug hole in preparation for the installation of the threaded insert, the metal shavings can be blown by pressurized gas, such as compressed air, from the cylinder. This procedure has been found to work well to remove the shavings. However, it is important that the cylinder valves be closed during the procedure in order to prevent metal shaving from being blown into and/or through the valve openings. With the valves closed, the compressed air entrains the metal shavings and carries the metal shavings out of the cylinder through the spark plug hole. Therefore, before beginning the repair procedure described in U.S. Pat. No. 6,668,784, the device of this invention can be used to ensure that the valves in the cylinder are closed, and preferably, that the piston is in the lower portion of the cylinder, near the start of the compression stroke. Thus, the present invention also includes a method of cleaning metal shavings from a cylinder, particularly metal shavings formed while drilling and tapping a spark plug hole that has damaged threads that can no longer safely hold a spark plug therein, in preparation for the installation of a threaded insert in the engine head which replaces the threads for the spark plug hole.

The method of cleaning metal shavings from a cylinder, which will be described in connection with a method for installation of a threaded insert in an engine head to replace damaged threads in a spark plug hole, such as the method of U.S. Pat. No. 6,668,784, includes as the first step positioning the piston in the cylinder to be worked on at least two to four inches down in the cylinder from the top of the cylinder with the cylinder valves closed. This can be accomplished by use of the leak testing device of the invention to position the piston in the cylinder near the start of its compression stroke, in the manner described above. The positioning of the piston in the cylinder can be checked by use of a bore scope or by other known means. It should be noted that the rubber stopper in the device can be pressed into and seal the spark plug hole even though the threads of the spark plug hole are damaged. Once the cylinder valves are closed and the piston is properly positioned in the cylinder, repair of the threads can begin. This involves drilling out the damaged threads in the spark plug hole which enlarges the hole, threading the enlarged hole to accept a threaded insert in the hole, and threading the insert into the threaded enlarged hole with the insert providing a new spark plug receiving hole. With the method of the cited patent, special guides are used for the drilling and tapping of the hole. Thus, once the piston is positioned in the cylinder, a drill guide pilot is positioned in the spark plug bore in the engine head in alignment with the spark plug hole. A drill bit is passed through the drill guide pilot and attached to a driver, such as an air ratchet or air wrench, and the spark plug hole is drilled out. The drill bit and drill guide pilot is removed and a tap guide pilot is placed in the spark plug bore in the engine head in alignment with the enlarged spark plug hole. A tap is passed through the tap guide pilot and attached to a driver, such as an air ratchet or air wrench, and the spark plug hole is threaded. Additional details of this procedure are described in the cited patent.

At this point, after drilling and threading the spark plug hole, the cylinder usually has metal shavings therein resulting from the drilling and threading of the spark plug hole. According to the present invention, a blow tube is now inserted into the cylinder and the end of the blow tube is positioned near the top of the piston in the cylinder. Pressurized gas, usually pressurized air from the shop compressed air supply which usually has a pressure of between about one hundred and one hundred and twenty five PSI, flows from the end of the blow tube against the top of the piston. It has been found that the pressurized air flowing from the blow tube in the cylinder entrains the metal cuttings, and any other debris that may have entered the cylinder, and carries them out of the cylinder through the spark plug hole. The blow tube can be formed by placing a tube, such as a plastic tube, over the end of a standard air gun that can be connected through a quick connect coupling to the shop air supply. The standard air gun includes a trigger to start and stop the flow of air through the air gun. The tube attached to the air gun should be at least about ten inches long so it can reach the top of the piston in the cylinder. After blowing out the cylinder, the cylinder can be inspected with a bore scope to ensure that all shavings and debris has been removed.

After cleaning the metal cuttings from the cylinder, the threaded insert is screwed into the newly threaded enlarged hole in the head, preferably with an adhesive or bonding agent, such as J-B WELD, on the outer threads of the insert so the insert is secured to the engine head. (The insert can be inserted before cleaning the cylinder, if desired.) The insert can be easily screwed into the newly threaded hole in the engine head by first screwing the spark plug into the insert and then screwing the insert with the spark plug therein into the threaded hole in the head. Once the adhesive or bonding agent sets, spark plugs can be easily removed from or inserted into the new spark plug hole formed by the insert.

While the device of the invention shows a stopper to be manually held in sealing relationship in the spark plug hole, the end of the hose (and hose is used to include various other conduits, such as pipes, or tubing) could otherwise be secured or held in the spark plug hole and gas pressure measuring means, such as a pressure gauge or balloon, could be provided in communication with the hose to indicate the build-up of pressure in the cylinder. Also, as indicated, various types of orifices and means for holding or forming the orifices can be used to control the flow of pressurized gas into the cylinder. As used herein, orifice could also include other means or ways of controlling or regulating the flow of pressurized gas into the cylinder, such as a valve or pressure regulator which produces an adjustable orifice through the valve or regulator.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein.

The invention claimed is:

1. Apparatus for detecting cylinder leaks allowing more than a predetermined maximum volume of pressurized gas to leak from a cylinder in an internal combustion engine, comprising:
a hose having a first end configured to be held by manual pressure by a user in sealing position in communication with a spark plug hole connecting to the cylinder to be tested wherein build up of pressurized gas in the cylinder will act against the manual pressure applied by the user to hold the end in the spark plug hole, and a second end configured for attachment to a source of pressurized gas pressurized to a pressure that will require noticeable force by a user to hold the end in place in the spark plug hole if such pressure builds up within the cylinder; and
an orifice positioned between the first and second ends with no flow connections between the orifice and first end, said orifice positioned to limit flow of pressurized gas from the source of pressurized gas into the cylinder to be tested when the second end of the hose is connected to a source of pressurized gas, said orifice limiting the flow of pressurized gas to an amount about equal to the predetermined maximum allowable leakage, leakage more than the predetermine maximum being determined by a lack of pressure build up in the cylinder while leakage less than the predetermined maximum being determined by a build up of pressure in the cylinder which is determined by the user noticing that force is required to hold the first end in the spark plug hole.

2. Apparatus for detecting cylinder leaks according to claim 1, wherein the first end of the hose includes a resilient stopper sized to seal the first end of the hose with respect to the spark plug hole when manually pressed into and held in the spark plug hole.

3. Apparatus for detecting cylinder leaks according to claim 2, wherein the orifice is formed by a hose fitting secured to one end of the hose.

4. Apparatus for detecting cylinder leaks according to claim 3, wherein the fitting with the orifice is positioned at the second end of the hose.

5. Apparatus for detecting cylinder leaks according to claim 3, wherein at least a portion of the hose is a flexible hose.

6. Apparatus for detecting cylinder leaks according to claim 1, wherein the orifice is formed by a hose fitting secured to one end of the hose.

7. Apparatus for detecting cylinder leaks allowing more than a predetermined maximum volume of pressurized gas to leak from a cylinder, comprising:
a conduit having a first end configured to be held by manual pressure by a user in sealing position in communication with a spark plug hole connecting to the cylinder to be tested wherein build up of pressurized gas in the cylinder will act against the manual pressure applied by the user to hold the end in the spark plug hole, and a second end configured for attachment to a source of pressurized gas pressurized to a pressure that will require noticeable force by a user to hold the end in place in the spark plug hole if such pressure builds up within the cylinder; and
means, when the second end of the conduit is connected to a source of pressurized gas, to control flow of pressurized gas from the source of pressurized gas into the cylinder to be tested to an amount about equal to the predetermined maximum allowable leakage, leakage more than the predetermine maximum being determined by a lack of pressure build up in the cylinder while leakage less than the predetermined maximum being determined by a build up of pressure in the cylinder which is determined by the user noticing that force is required to hold the first end in the spark plug hole, there being no flow connections to the conduit between the means and the first end.

8. Apparatus for detecting cylinder leaks according to claim 7, wherein the first end of the conduit includes a resilient stopper sized to seal the end of the conduit with respect to the spark plug hole when manually pressed into and held in the spark plug hole.

9. Apparatus for detecting cylinder leaks according to claim 8, wherein the conduit includes a flexible hose.

10. Apparatus for detecting cylinder leaks according to claim 9, wherein the means to control flow of pressurized gas from the source of pressurized gas into the cylinder to be tested is an orifice positioned between the source of pressurized gas and the first end of the conduit.

11. A method for detecting cylinder leaks, comprising:
- manually holding a source of pressurized gas in sealing position in a spark plug hole connecting to a cylinder to be tested, the pressure of the pressurized gas being sufficient to require noticeable force by a user to hold the first end in place in the spark plug hole if such pressure builds up within the cylinder;
- controlling the flow of pressurized gas into the cylinder to be tested to limit the flow of gas to a maximum amount of allowable gas leakage from the cylinder; and
- determining if gas pressure builds up in the cylinder during gas flow into the cylinder, lack of gas pressure build-up indicating cylinder leakage and a build up of pressure in the cylinder, which is determined by the user noticing that force is required to hold the first end of the conduit in the spark plug hole, indicating leakage less than the allowable maximum.

12. A method for detecting cylinder leaks according to claim 11, wherein the source of pressurized gas is manually connected in sealing position in a spark plug hole connecting to the cylinder to be tested by a hose having a resilient stopper associated with a first hose end configured for communication with the spark plug hole and sized to seal the first end of the hose with respect to the spark plug hole when manually pressed by a user into and held in the spark plug hole.

13. A method for detecting cylinder leaks according to claim 12, wherein the step of controlling the flow of pressurized gas into the cylinder to be tested to limit the flow of gas to the maximum amount of allowable gas leakage from the cylinder includes the step of connecting the source of pressurized gas to the cylinder to be tested through an orifice which limits the flow of gas between the source of pressurized gas and the cylinder.

14. A method for detecting cylinder leaks according to claim 11, wherein the step of controlling the flow of pressurized gas into the cylinder to be tested to limit the flow of gas to the maximum amount of allowable gas leakage from the cylinder includes the step of connecting the source of pressurized gas to the cylinder to be tested through an orifice which limits the flow of gas between the source of pressurized gas and the cylinder.

15. Apparatus for detecting cylinder leaks according to claim 7, wherein the means to control flow of pressurized gas from the source of pressurized gas into the cylinder to be tested is an orifice positioned between the source of pressurized gas and the first end of the conduit.

\* \* \* \* \*